Feb. 1, 1955 H. L. BARNEY 2,701,309

SEMICONDUCTOR OSCILLATION GENERATOR

Filed Dec. 24, 1948

INVENTOR
H. L. BARNEY
BY Harry C. Hart
ATTORNEY

United States Patent Office
2,701,309
Patented Feb. 1, 1955

2,701,309

SEMICONDUCTOR OSCILLATION GENERATOR

Harold L. Barney, Madison, N. J., assignor to Bell Telephone Laboratories, Incorporated, New York, N. Y., a corporation of New York Application December 24, 1948, Serial No. 67,159

11 Claims. (Cl. 250—36)

This invention relates to signal translation networks utilizing semiconductor amplifiers as active elements.

The principal object of the invention is to generate electrical oscillations in a novel manner.

A related object is to amplify the signals of a source, using the principles of positive feedback and regeneration.

A related object is to provide an oscillation generator which shall be simple, rugged and compact, and which shall start to operate immediately it is switched into operating condition.

United States Patent 2,524,035 was issued on October 3, 1950, on an application of John Bardeen and W. H. Brattain, Serial No. 33,466, filed June 17, 1948. This application is a continuation-in-part of an earlier application of the same inventors, Serial No. 11,165, filed February 26, 1948, and, after the filing of the later application, allowed to become abandoned. The patent describes and claims an amplifier unit of novel construction, comprising a small block of semiconductor material, such as N-type germanium, with which are associated three electrodes. One of these, known as the base electrode, makes low resistance contact with a face of the block. It may be a plated metal film. The others, termed emitter and collector, respectively, preferably make rectifier contact with the block. They may, in fact, be point contacts. The emitter is biased to conduct in the forward direction and the collector is biased to conduct in the reverse direction. "Forward" and "reverse" are here used in the sense in which they are understood in the rectifier art. When a signal source is connected between the emitter and the base and a load is connected in the collector circuit, it is found that an amplified replica of the voltage of the signal source appears across the load. The patent contains detailed specifications for the fabrication of the device.

The device may take various forms, all of which have properties which are generally similar although they differ in important secondary aspects. Examples of such other forms are described and claimed in an application of J. N. Shive, Serial No. 44,241, filed August 14, 1948, now Patent 2,691,750, issued October 12, 1954, and an application of W. E. Kock and R. L. Wallace, Jr., Serial No. 45,023, filed August 19, 1948, now Patent 2,560,579 issued July 17, 1951. The device in all of its forms has received the appellation "Transistor," and will be so designated in the present specification.

In the earlier Bardeen-Brattain application above referred to, there appears a tabulation of the performance characteristics of three sample transistors. In one of these, it appears that increments of signal current which flow in the circuit of the collector electrode as a result of the signal current increments which flow in the circuit of the emitter electrode exceed the latter in magnitude. This current amplification feature of transistors has become the general rule, and appears in nearly all transistors fabricated. It is discussed in detail in the aforementioned continuation-in-part application of John Bardeen and W. H. Brattain, and in their patent. It is of such importance in connection with the present invention, as well as others, that the ratio of these increments has been given a name, "$\alpha$." In the present invention, the presence of such a current gain factor, not heretofore available in conventional vacuum tube amplifiers, is turned to account in the construction of a self-oscillation circuit or oscillation generator of novel configuration.

When the external circuit of a transistor amplifier is of the so-called "grounded base" configuration; i. e., the emitter and the base are its input terminals and the collector and the base are its output terminals, the collector (output) current is in phase with the emitter (input) current. As long as the collector current exceeds the emitter current in magnitude, a fraction of the collector current equal to the emitter current may be fed back to the emitter, the balance being supplied to a useful load. Operation then continues even though all other signal frequency sources of emitter current be removed. That is to say, self-oscillation takes place.

Because of the phase identity above referred to, this feedback may be effected by way of the simplest possible means, namely, by a current path comprising a conductive connection from the collector to the emitter and including only such impedance elements, such as an output transformer winding and protective resistors, as may be required for utilization and for stability. The collector current returns to the transistor by way of two paths in parallel, namely, the emitter electrode and the base electrode. Evidently, the fraction of the collector current which is returned to the emitter by way of the feedback path is increased, and the desired feedback is promoted, by the inclusion of a suitable impedance element connected in series with the base electrode. The greater the magnitude of this impedance, the smaller is the fraction of the current returned by way of the base and the greater the useful fraction, which returns by way of the emitter. This fraction, returned to the emitter, reappears multiplied by the current gain factor $\alpha$ at the collector; and this increased current flows out of the collector electrode and divides between the emitter and the base as described above. Thus, an increase of the impedance in series with the base electrode results in an increase of positive feedback or regeneration. If pushed sufficiently far, i. e., so far as to outweigh the losses due to other resistances in the network, this increase causes instability and the network sings or breaks into self-oscillations.

This self-oscillation may be restricted to a desired frequency or frequencies in various ways. One convenient way is to arrange that the impedance element in series with the base electrode shall be a high impedance at the desired frequency or frequencies of oscillation and at no others. For example, an antiresonant circuit comprising a coil and a condenser connected in parallel offers a very high impedance at the frequency of resonance and a much lower impedance at frequencies off resonance, both higher and lower. Furthermore, at or very close to this frequency its impedance is of a purely resistive character so that it introduces substantially no alteration in the phase of the feedback current. On the other hand at frequencies off resonance, it introduces a substantial alteration in phase of the current fed back, so that the in-phase component, which is the only one tending to maintain oscillations, is still further reduced. Therefore, it serves to promote the feedback which maintains the self-oscillations at the frequency to which it is tuned, and at no others.

Broadly speaking, the same considerations hold for an oscillation generator based on a transistor amplifier of the grounded collector circuit configuration or, indeed, for any circuit configuration characterized by phase coincidence between output current and input current, utilizing a transistor whose current gain factor is greater than unity.

The invention is not restricted to the use of an impedance element of such magnitude as to promote feedback to the extent that the circuit breaks into self-oscillation. It is also useful as a regenerative amplifier which may be tuned in the manner described above by the use of an impedance element whose impedance is a function of frequency to accentuate the amplification of signals of a desired frequency, or it may be untuned. For example, a resistor may be employed which promotes feedback in a desired amount from collector to emitter, at all frequencies equally, but short of the point at which self-oscillation starts. In this case a small signal applied to the input terminals reappears at the output terminals of the amplifier, amplified to an extent which is much greater than that which is possible without the use of the positive feedback of the invention.

Various alternatives to the antiresonant reactive circuit described above may be employed. For example, the parallel combination of a resistor and a condenser may be connected in series with the base electrode. This operates to diminish the current returned to the base electrode and so to promote feedback from the collector to the emitter at the low frequencies at which its impedance is high. With this circuit and no more, the system operates satisfactorily as a regenerative amplifier for low frequencies, and has reduced gain at the higher frequencies which are above the useful range by virtue of the condenser which reduces the effective impedance of the resistor-condenser network at the high frequencies. If it is desired to promote self-oscillations at a particular frequency, the impedance of the network connected in the base electrode lead may be increased to the point at which the system would become unstable at low frequencies, and another network, consisting of a resistor and a condenser connected in parallel, may be connected in series in the feedback path, for example, in series with the collector. This offers a high series impedance to the feedback current at the low frequencies and so tends to prevent the flow of sufficient feedback current to maintain self-oscillation, except at the higher frequencies. As explained above, the effect of the condenser and resistance network in the base electrode connection is to introduce regeneration or self-oscillation at the lower frequencies. The combination of the two effects is to restrict the frequency of self-oscillation to some intermediate frequency. At the intermediate frequency at which these two effects are balanced, the net current fed back from the collector to the emitter in proper phase is a maximum; and by adjustment of the magnitudes of the resistors in the base electrode lead and the collector electrode lead with respect to the intrinsic resistance of the transistor, the feedback at this frequency may be made sufficient to promote sustained self-oscillations at this frequency.

The invention will be fully apprehended from the following detailed description of certain preferred embodiments thereof, taken in connection with the appended drawings in which.

Figure 1:
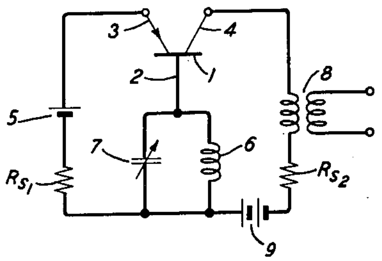
Fig. 1 is a schematic circuit diagram showing an oscillation generator in accordance with the invention.

Referring now to the drawings, Fig. 1 shows a transistor amplifier comprising a block 1 of semiconductor material such as N-type germanium provided with a low resistance base electrode 2, a point contact emitter electrode 3 and a point contact collector electrode 4. The emitter 3 is connected to the base 2 by way of a bias battery 5 of a fraction of a volt, a resistor $R_{S1}$ and an antiresonant reactive network comprising a coil 6 and a condenser 7 connected in parallel. The collector 4 is connected to the base 2 by way of the primary winding of an output transformer 8, a resistor $R_{S2}$, a bias battery 9 of 40–100 volts, and the anti-resonant network. If preferred, the emitter bias may be derived from the collector battery 9 by the employment of an appropriate self-bias network. Such self-bias networks are described in an application of H. L. Barney and R. C. Mathes, Serial No. 22,854, filed April 23, 1948, now Patent 2,517,960, issued August 8, 1950, and in an application of H. L. Barney, Serial No. 49,951, filed September 18, 1948, and thereafter abandoned, and in a continuation-in-part application of the same inventor, Serial No. 123,507, filed October 25, 1949, now Patent 2,647,958 issued August 4, 1953.

Figure 2:
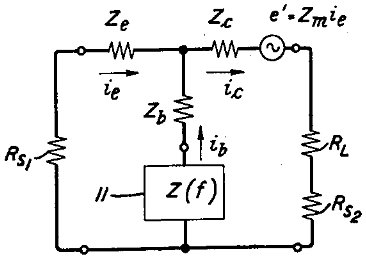
Fig. 2 is a circuit equivalent of Fig. 1.

Fig. 2 shows the equivalent circuit of the network of Fig. 1 in the form of an equivalent four-pole, with the resistor $R_{S1}$ connected to its emitter and reactive network terminals, and the resistor $R_{S2}$ connected to its collector and base terminals. The effect of the output transformer 8 and any load to which it may be connected are lumped in a resistor $R_L$ also connected externally. Within the four-pole itself, the direct current bias sources 5 and 6 of Fig. 1 are omitted as being unessential to the consideration of the alternating current behavior of the circuit. The resistor $Z_e$ represents the emitter resistance of the transistor, the resistor $Z_b$ represents the base resistance, the resistor $Z_c$ represents the collector resistance, and the amplification feature of the transistor is represented by a fictitious generator whose electromotive force $e'$ is equal to the product of a constant $Z_m$ by the emitter current $i_e$. The emitter current $i_e$, the base current $i_b$ and the collector current $i_c$ are taken in the directions indicated by the arrows. The output transformer of Fig. 1 and the load to which it may be connected are represented by a load resistor $R_L$. The antiresonant circuit of Fig. 1, or, indeed, any network whose impedance is a function of frequency, is represented by the box 11. This equivalent network and its use in the analysis of transistor operation is fully discussed in an application of H. L. Barney, Serial No. 58,684, filed November 6, 1948, and issued on February 12, 1952, as Patent 2,585,077. This patent was thereafter surrendered in favor of Re-issue Patent 23,563 of August 14, 1952.

The operation of the network of Fig. 1 may be clearly understood from a consideration of Fig. 2. First, note that the collector current $i_c$ is shown as being the sum of the emitter current $i_e$ and the base current $i_b$. If the impedance Z($f$) of the frequency responsive network 11 be taken as infinite, which is the case for an ideal or lossless antiresonant network of the configuration of Fig. 1, then the base current $i_b$ vanishes, and the collector current $i_c$ is equal to the emitter current $i_e$. The only source of electromotive force in the resulting closed circuit is the equivalent generator $e'$, and, equating this electromotive force to the sum of the voltage drops around the loop, in accordance with Kirchoff's Second Law, and disregarding, for the present, the voltage drops in $R_{S1}$ and $R_{S2}$, $$e'=Z_m i_e=(Z_e+Z_c+R_L)i_e$$

or $$(Z_e+Z_c+R_L-Z_m)i_e=0 \qquad (1)$$

Thus it can be seen that if $Z_m=Z_e+Z_c+R_L$, the current $i_e$ will neither increase nor diminish. If, however, $$Z_m>Z_e+Z_c+R_L \qquad (2)$$

then $i_e$ increases until it is limited by non-linearity of the system. This is the usual condition for self-oscillation. If, on the other hand, $$Z_m<Z_e+Z_c+R_L \qquad (3)$$

then the current $i_e$ diminishes to zero and the system is stable, i. e., it does not engage in self-oscillation.

If, instead of the very simple case in which Z($f$) is taken as infinite, some finite value is assigned to Z($f$), the same sort of considerations still hold. $i_c$ now splits into two parts, $i_e$ and $i_b$; and if the fraction $i_e$ is sufficiently large so that the generator voltage $e'$ can overcome the voltage drops in $R_L$ and $Z_c$ and supply the base current $i_b$, with a fraction left over whose in-phase component is equal to or larger than $i_e$ originally assumed, self-oscillations will occur.

Assuming resistive values $r_e$, $r_c$, $r_b$ and $r_m$ for the transistor equivalent circuit parameters (and the parameters of actual physical transistors are, in fact, purely resistive up to frequencies in the megacycle range) and R($f$) for the impedance of the network 11 in the base electrode connection, then the condition for self-oscillation, i. e., that $i_e$ should increase in magnitude to a point limited by non-linear characteristics of the circuit elements, may be readily shown to be:

$$r_m>r_e'+r_c'+R_L+\frac{r_e'(r_c'+R_L)}{r_b+R(f)} \qquad (4)$$

where $$r_e'=r_e+R_{S_1}$$

and $$r_c'=r_c+R_{S_2}$$

If $r_m$ is less than the sum of the terms on the right side of (4), the effect of an increase in R($f$) is to promote positive feedback or regeneration, provided that $\alpha$ is greater than unity. Thus by controlling the characteristics of Z($f$), selective or equalizing amplification may be obtained with this arrangement, or if Z($f$) is independent of frequency over the range of interest, a uniform increase of gain by regenerative action is obtained.

It may also be seen that a degree of control of oscillation may be applied by varying $R_L$, $R_{s1}$ or $R_{s2}$. Thus, if any one or more of these quantities is increased, the right-hand terms of the expression (1) may be increased so that the condition for oscillation will no longer exist.

It further follows that the relationship (4) may be applied to consideration of other transistor circuit configurations than the grounded base arrangement, for in fact the signal may be inserted in series with any of the three electrodes and taken off at any of the remaining electrodes, and the ground point may be placed at any of the three electrodes or at points not directly connected with an electrode, without altering the validity of the criterion for instability expressed in (4).

Figure 3:
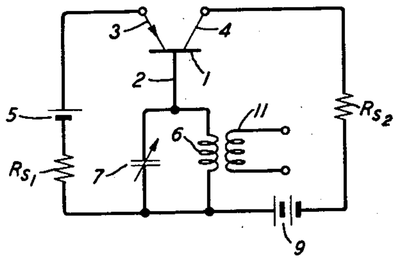
Fig. 3 is a schematic circuit diagram of a modification of Fig. 1.

Fig. 3 is a schematic circuit diagram of an oscillator network which is the same as Fig. 1 except that the output transformer 8 is replaced by a secondary winding 11 inductively coupled to the coil 6 of the reactive network. Self-oscillations in this circuit occur at the resonant frequency of the network 6, 7 and by transformer action, the output is applied to the load through terminals. Control of the oscillation amplitude may be applied by varying the magnitude of either of the resistors $R_{s1}$, $R_{s2}$ in series with the emitter and the collector, respectively in the same manner as described in connection with $R_L$ of Fig. 2.

Figure 4:
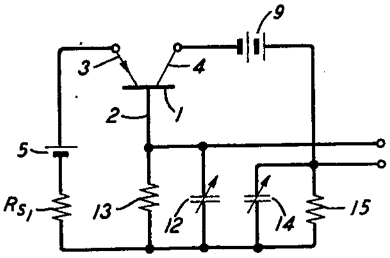
Fig. 4 is a schematic circuit diagram illustrating another embodiment of the invention.

Fig. 4 is a schematic circuit diagram of another embodiment of the invention in which the impedance in series with the base electrode 2 comprises a condenser 12 and a resistor 13 in parallel, and the impedance in series with the collector 4 also consists of a condenser 14 and a resistor 15 in parallel. Bias sources 5, 9, and series resistor $R_{s1}$ are as described above and perform the same functions. The resistor 15 serves the same purpose as the resistor $R_{s2}$, in addition to determining, in part, the frequency of oscillation in the manner to be described. The operation of this network may be explained with reference to Fig. 6.

Figure 6:
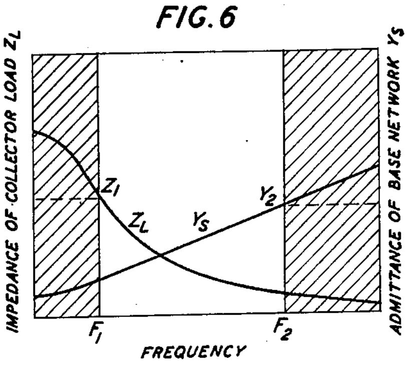
Fig. 6 is a graph of impedances and admittances illustrating the operation of the circuit of Fig. 4.

In Fig. 6, the impedance of the parallel combination of resistor 15 and condenser 14 is plotted versus frequency as $Z_L$. The admittance of the parallel combination of resistor 13 and condenser 12 is plotted as $Y_s$. The characteristics of the transistor taken to illustrate this operation are such that the circuit of Fig. 4 will not oscillate unless the impedance of $Z_L$ is less than a certain critical value $Z_1$, even though the admittance of the parallel combination in the base circuit $Y_s$ is zero. At frequency $F_1$, $Z_L$ has the value $Z_1$ and for higher frequencies it is less than $Z_1$, thus tending more strongly to promote oscillation at the higher frequencies. On the other hand, the effect of $Y_s$ in the base circuit is in the opposite sense. At frequency $F_2$, $Y_s$ has the critical value $Y_2$, and for higher frequencies the admittance is so high that the circuit will not oscillate even though $Z_L$ may be reduced to zero, due to the fact that so large a proportion of current $i_c$ from the collector 4 is shunted to the base 2. At lower frequencies, $Y_s$ assumes lower values, thus tending to promote oscillation.

Between the two frequencies $F_1$ and $F_2$ is a region in which these effects may be balanced against each other, and a net current fed back to the emitter which is large enough, and the phase of which is proper, to sustain oscillations. The particular frequency within this region at which sustained self-oscillations take place is that frequency at which the quadrature component of the emitter current introduced by the network 12, 13 is exactly balanced by the quadrature component of the emitter-to-base voltage introduced by the network 14, 15, so that a maximum fraction of in-phase current is fed back from the collector to the emitter. This self-oscillation frequency may be ascertained by a consideration of the equivalent circuit representation of Fig. 2, assuming that the impedance $Z(f)$ of the network 11 is that of the parallel combination of condenser 12 with resistor 13 of Fig. 4, that the resistances $R_{s1}$ and $R_{s2}$ are zero or negligible, and that the load impedance $R_L$ represents the impedance of the parallel combination of the condenser 14 with the resistor 15 of Fig. 4. The collector current $i_c$ resulting from the internally generated electromotive force $$e'=r_m i_e$$

thus flows in series through the impedance $R_L$, which has a leading phase angle due to the condenser 14, and is shunted by the impedance $Z(f)$ of the network 11 in series with the base resistance $r_b$, which tends to introduce a lag in the phase of the current due to the effect of the condenser 12. The resultant current $i_e$ which flows into the emitter at the oscillating frequency is in phase with the driving voltage $e'=r_m i_e$, and its magnitude is just large enough to be equal to the collector current $i_e$ which was originally assumed in taking the internally generated electromotive force to be equal to $r_m i_e$.

Figure 7:
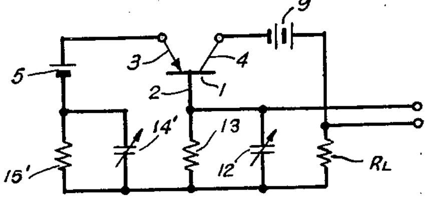
Fig. 7 is a schematic circuit diagram illustrating a modification of the circuit of Fig. 4.

Instead of being connected in series with the collector 4, the parallel combination of the condenser 14 with the resistor 15 may, if preferred, be inserted in the emitter lead. Such a modification of Fig. 4 is illustrated in Fig. 7. Here the resistor-condenser combination 15', 14', in series with the emitter electrode 3 replaces the resistor-condenser combination 15, 14, which is in series with the collector 4 of Fig. 4. Once this substitution has been made, the resistor 15' of Fig. 7 also serves the purpose of the resistor $R_{s1}$ of Fig. 4. Hence the latter is not independently shown in Fig. 7. By the same token the removal of the resistor-condenser combination 14, 15, of Fig. 4 necessitates the insertion of a load resistor $R_L$ in Fig. 7. In this case the operation by which the oscillation-sustaining feedback is attained, and by which the counteracting effect of leading and lagging phase angles by the two condenser-resistor networks to obtain a feedback current to the emitter would satisfy the criterion for self-oscillation is similar to the mode of operation just described.

The output from the circuit of Fig. 4 may be taken between any two of the three terminals.

Figure 5:
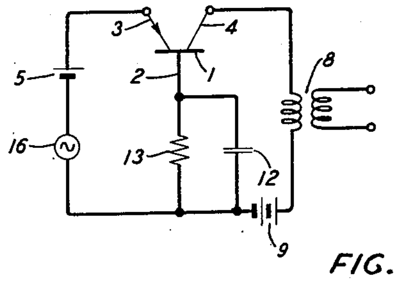
Fig. 5 is a schematic circuit diagram illustrating the application of the principles of the invention to the regenerative amplification of a signal derived from an external source.

Fig. 5 is a schematic circuit diagram of a transistor amplifier designed in accord with the principles of the invention in which regenerative action is obtained to increase the gain by insertion of a reactive network in the lead to the base electrode. The signal from an input source 16 is applied through the bias source 5 to the emitter 3 and through a resistor 13 in parallel with a condenser 12 to the base 2 of the transistor. The primary winding of an output transformer 8 is connected in the circuit of the collector 4. Bias voltages are applied to the electrodes as before.

Input signals of the source 16 are amplified and appear in the collector circuit from which they are coupled to an outgoing line or other load by the transformer 8. If it were not for the resistor 13 and the condenser 12, this circuit would be a conventional transistor amplifier of the grounded base configuration, such as is disclosed in the aforementioned applications of John Bardeen and W. H. Brattain. The introduction of an impedance in the base electrode lead results in regeneration as described in connection with Fig. 2 above. If the magnitude of this added impedance is maintained below a critical value at which self-oscillation starts, the amplifier gain is increased by the regenerative action. In the circuit of Fig. 5, the magnitude of the added impedance is greatest at low frequencies, consequently the overall amplifier gain will be greatest at low frequencies. At high frequencies at which the condenser impedance becomes less than the value of the resistance, the regenerative action decreases, with consequent overall reduction of gain.

Both in the oscillating networks of Figs. 1, 3 and 4 and in the regenerative amplifier network of Fig. 5, the impedance of the network introduced into the base electrode lead may be given other characteristics to obtain a desired overall gain characteristic.

What is claimed is:

1. An oscillation generator which comprises a transistor comprising a semiconductive body, a base electrode, an emitter electrode and a collector electrode cooperatively associated therewith, said transistor being characterized by a ratio of short-circuit collector current increments to emitter current increments which, under proper conditions of electrode bias is greater than unity, means including an energy source for establishing said proper bias conditions, an external network interconnecting said electrodes with a junction point, said network including a first parallel-connected resistor-condenser combination connected in series between the base electrode and said junction point to promote feedback of collector current to the emitter at low frequencies, and a second parallel-connected resistor-condenser combination connected in series with the collector electrode to restrict said feedback to intermediate frequencies.

2. A self-oscillating system which comprises a current-multiplication transistor having a semiconductive body, an emitter electrode, a base electrode and a collector electrode engaging said body, means for biasing said emitter electrode in the forward direction with respect to a fixed potential point and said collector electrode in the reverse direction with respect to said fixed potential point, said transistor being characterized, in operation, by collector output current increments which are in phase with and greater in magnitude than its emitter input current increments, an external low impedance feedback path extending from said collector electrode to said emitter electrode, said feedback path being devoid of phase reversing elements, a connection from said base electrode to a point of said feedback path, adapted to divert to said base electrode collector currents which would otherwise reach said emitter electrode, said connection including, in series, a frequency-selective impedance element for substantially preventing said diversion at a desired frequency.

3. Apparatus as defined in claim 2 wherein said impedance element has a high impedance at said desired frequency and a lower impedance at lower frequencies.

4. Apparatus as defined in claim 2 wherein said impedance element has a substantial impedance at said desired frequency and higher impedance at lower frequencies.

5. In combination with apparatus as defined in claim 4, a second impedance element connected in series in said feedback path, said second element having at each frequency of a range an impedance substantially like that of said first impedance element.

6. In combination with apparatus as defined in claim 2 wherein said impedance element has an impedance which varies monotonically with frequency, a second impedance element connected in series in said feedback path, said second element having an impedance which varies with frequency in the same fashion as said first impedance element.

7. Apparatus as defined in claim 2 wherein said impedance element has a high impedance at said desired frequency and lower impedance at both higher and lower frequencies.

8. The combination defined in claim 7 wherein the impedance element comprises an antiresonant network of inductance and capacitance.

9. The combination defined in claim 7 wherein the impedance element comprises an inductor and a condenser connected in parallel.

10. In combination with apparatus as defined in claim 2, a second impedance element connected in series in said feedback path for controlling the magnitude of currents traversing said path.

11. Apparatus as defined in claim 10 wherein said second impedance element is a resistor.

References Cited in the file of this patent

UNITED STATES PATENTS

| | | |
|---|---|---|
| 1,624,537 | Colpitts | Apr. 12, 1927 |
| 1,745,175 | Lilienfeld | Jan. 28, 1930 |
| 1,896,781 | Llewellyn | Feb. 7, 1933 |
| 1,900,018 | Lilienfeld | Mar. 7, 1933 |
| 1,976,570 | Llewellyn | Oct. 9, 1934 |
| 2,115,858 | Keall | May 3, 1938 |
| 2,245,718 | Roberts | June 17, 1941 |
| 2,411,565 | Wilson | Nov. 26, 1946 |
| 2,469,569 | Ohl | May 10, 1949 |
| 2,524,035 | Bardeen et al. | Oct. 3, 1950 |